United States Patent [19]

Demmering et al.

[11] Patent Number: 5,389,113
[45] Date of Patent: Feb. 14, 1995

[54] MIXTURES OF FATTY ALKYL LOWER ALKYL ESTERS HAVING IMPROVED LOW-TEMPERATURE STABILITY

[75] Inventors: Guenther Demmering, Solingen; Karl Schmid, Mettmann; Frank Bongardt, Duesseldorf; Leonhard Wittich, Langenfeld, all of Germany

[73] Assignee: Henkel Kommanditgesellschaft auf Aktien, Duesseldorf, Germany

[21] Appl. No.: 78,197

[22] PCT Filed: Dec. 4, 1991

[86] PCT No.: PCT/EP91/02312

§ 371 Date: Aug. 17, 1993

§ 102(e) Date: Aug. 17, 1993

[87] PCT Pub. No.: WO92/11345

PCT Pub. No.: Jul. 9, 1992

[30] Foreign Application Priority Data

Dec. 17, 1990 [DE] Germany ............................ 4040317

[51] Int. Cl.⁶ ............................................. C10L 1/02
[52] U.S. Cl. ............................................. 44/388; 44/397
[58] Field of Search .............. 252/56 S, 56 R; 44/388, 44/397; C10L 1/18, 1/02

[56] References Cited

U.S. PATENT DOCUMENTS 4,364,743 12/1982 Erner ..................... 44/388
5,039,432 9/1991 Ritter et al. ............ 252/8.3

FOREIGN PATENT DOCUMENTS 0543356 11/1992 European Pat. Off. .
3807395 2/1989 Germany .
2090611 7/1982 United Kingdom .
2099449 12/1982 United Kingdom .

*Primary Examiner*—Stephen Kalafut
*Assistant Examiner*—Cephia D. Toomer
*Attorney, Agent, or Firm*—Wayne C. Jaeschke; Norvell E. Wisdom, Jr.; John E. Drach

[57] ABSTRACT

Mixtures containing a) 58 to 95% by weight of at least one ester with an iodine value of 50 to 150 derived from fatty acids containing 12 to 22 carbon atoms and lower aliphatic alcohols containing 1 to 4 carbon atoms, b) 4 to 40% by weight of at least one ester of fatty acids containing 6 to 14 carbon atoms and lower aliphatic alcohols containing 1 to 4 carbon atoms and c) 0.1 to 2% by weight of at least one polymeric ester, are distinguished by particular low-temperature stability and can be used as a fuel for diesel engines.

16 Claims, No Drawings

MIXTURES OF FATTY ALKYL LOWER ALKYL ESTERS HAVING IMPROVED LOW-TEMPERATURE STABILITY

This application is a continuation of PCT/EP91/02312, filed December 4, 1991.

FIELD OF THE INVENTION

This invention relates to mixtures of fatty acid lower alkyl esters having improved low-temperature stability, to a process for their production and to their use as a fuel for diesel engines.

STATEMENT OF RELATED ART

Non-inflammable mixtures consisting predominantly of paraffins with additions of olefins, naphthenes and aromatic hydrocarbons are normally used as fuels for diesel engines. Their composition is not uniform and depends to a large extent on the production process. Fuels of this type are obtained from petroleum and natural gas. Accordingly, their use contributes to the consumption of fossil, non-renewable raw materials. Accordingly, the use of diesel fuels based on fats and oils, i.e. renewable raw materials, has been discussed for some years [RAPS, 6, Sonderausgabe, 145 (1988)]. Technical fatty acid methyl ester mixtures ("biodiesel") have proved to be particularly suitable for this purpose. However, since these mixtures cannot be adequately filtered and solidify in the fuel pipes at temperatures below $-5°$ C., they cannot be used as a diesel fuel under winter conditions.

DESCRIPTION OF THE INVENTION

1. Object of the Invention

Accordingly, the problem addressed by the present invention was to develop a diesel fuel based on fatty acid esters which would have improved low-temperature stability.

2. Summary of the Invention

The present invention relates to mixtures of fatty acid lower alkyl esters having improved low-temperature stability which contain
  a) 58 to 95% by weight of at least one ester with an iodine value of 50 to 150 derived from fatty acids containing 12 to 22 carbon atoms and lower aliphatic alcohols containing 1 to 4 carbon atoms,
  b) 4 to 40% by weight of at least one ester of fatty acids containing 6 to 14 carbon atoms and lower aliphatic alcohols containing 1 to 4 carbon atoms and
  c) 0.1 to 2% by weight of at least one polymeric ester.

It has surprisingly been found that the low-temperature stability of biodiesel can be improved by the addition of short-chain fatty acid methyl esters and selected pour point depressants of the polymeric ester type to such an extent that the mixtures can still be pumped even at temperatures of $-19°$ C. and, hence, can readily be used as a fuel for diesel engines, even under severe winter conditions. The invention includes the observation that the choice of pour point depressants of component c) is not unlimited. Instead, only specific types are capable-together with the lower fatty alkyl esters of component b) - of satisfactorily improving the low-temperature stability of the fatty acid lower alkyl esters of component a).

DESCRIPTION OF PREFERRED EMBODIMENTS

Suitable fatty acid lower alkyl esters of component a) are technical mixtures of the ethyl, propyl, butyl and, in particular, methyl esters of $C_{12-22}$ fatty acids, i.e. for example lauric acid, myristic acid, palmitic acid, palmitoleic acid, stearid acid, oleic acid, elaidic acid, petroselic acid, ricinoleic acid, elaeostearic acid, linoleic acid, linolenic acid, arachic acid, gadoleic acid, behenic acid or erucic acid, which have an iodine value of 50 to 150 and, more particularly, 90 to 125. Mixtures having particularly advantageous properties are obtained when component a) consists of technical mixtures which, for the most part, i.e. of which at least 50% by weight, based on component a), contain methyl esters of fatty acids containing 16 to 22 carbon atoms and 1, 2 or 3 double bonds. The preferred fatty acid lower alkyl esters are oleic acid, linoleic acid, linolenic acid and erucic acid methyl ester.

Technical mixtures of the type mentioned are obtained, for example, by hydrogenation and esterification of natural fats and oils or by transesterification thereof with lower aliphatic alcohols. Fatty acid lower alkyl esters of component a) are advantageously produced from fats and oils of high iodine value, such as for example sunflower oil, rapeseed oil, coriander oil, castor oil, soybean oil, cottonseed oil, peanut oil or beef tallow. Preferred fatty acid alkyl esters are based on rapeseed oil from new plants in which more than 80% by weight of the fatty acid component is derived from unsaturated fatty acids containing 18 carbon atoms.

The fatty acid lower alkyl esters of component b) are ethyl, propyl, butyl or, in particular, methyl esters of fatty acids containing 6 to 14 carbon atoms, i.e. for example caproic acid, caprylic acid, capric acid, lauric acid or myristic acid or technical mixtures thereof. Fatty acid lower alkyl esters from this groups, which particularly improve the low-temperature stability of component a), are methyl esters of saturated fatty acids containing 8 to 10 carbon atoms.

The fatty acid lower alkyl esters of component b) are generally produced from fats and oils having an iodine value below 50 which are initially subjected to pressure hydrogenation. The mixture of fatty acids obtained is fractionated and the short-chain fatty acids containing 6 to 12 carbon atoms, the so-called "head-fractionated fatty acids", are first separated and then esterified. A preferred starting material for the production of esters of component b) is coconut oil.

Suitable polymeric esters of component c) are mixtures of polymeric esters of copolymers of esters of acrylic and/or methacrylic acid with alcohols containing 1 to 22 carbon atoms in the alcohol radical. These substances are known pour point depressants of which the production is described, for example, in German patent application DE-A-38 07 395.

The polymeric esters of component c) are derived from aliphatic primary alcohols. Typical examples are methanol, ethanol, n-propyl alcohol, i-propyl alcohol, n-butanol, ibutanol, tert. butanol, pentanol, hexanol, capryl alcohol, capric alcohol, undecyl alcohol, lauryl alcohol, myristyl alcohol, cetyl alcohol, palmitoleyl alcohol, stearyl alcohol, oleyl alcohol, behenyl alcohol or erucyl alcohol. The polymeric esters may also contain alcohol radicals derived from technical mixtures of the type obtained, for example, by high-pressure hydrogenation of technical fatty acid methyl ester fractions or reduction of aldehydes from Roelen's oxosynthesis.

Polymeric esters of component c), which particularly improve the low-temperature stability of component a), contain mixtures of polymeric esters or copolymer mixtures of esters of methacrylic acid with alcohols containing 4 to 14 carbon atoms and esters of methacrylic acid with methanol in a ratio by weight of 1:3 to 3:1 and, more particularly, 1:1. in addition the mixtures may contain mixtures of polymeric esters of copolymer mixtures of esters of acrylic acid with alcohols containing 4 to 14 carbon atoms in quantities of less than 10% by weight, based on the mixture as a whole.

The present invention also relates to a process for the production of mixtures of fatty acid lower alkyl esters having improved low-temperature stability, characterized in that a) 58 to 95% by weight of at least one ester with an iodine value of 50 to 150 derived from fatty acids containing 12 to 22 carbon atoms and lower aliphatic alcohols containing 1 to 4 carbon atoms, b) 4 to 40% by weight of at least one ester of fatty acids containing 6 to 14 carbon atoms and lower aliphatic alcohols containing 1 to 4 carbon atoms and c) 0.1 to 2% by weight of at least one polymeric ester, are mixed together.

Mixtures having particularly advantageous low-temperature stability are obtained when technical mixtures predominantly containing methyl esters of fatty acids containing 16 to 22 carbon atoms and 1, 2 or 3 double bonds are used as component a), methyl esters of saturated fatty acids containing 8 to 10 carbon atoms are used as component b) and copolymers of esters of acrylic and/or methacrylic acid with alcohols containing 1 to 22 carbon atoms in the alcohol radical are used as component c).

Components a), b) and c) may be mixed purely mechanically, for example by stirring; no chemical reaction takes place. Mixtures having particularly advantageous low-temperature stability may contain component b) in quantities of 10 to 30% by weight and, more particularly, 15 to 25% by weight and component c) in quantities of 1 to 1.5% by weight. All percentages are based on the mixture as a whole.

The mixtures according to the invention have improved low-temperature stability in relation to the prior art and are pumpable down to −19° C. Accordingly, the present invention also relates to the use of the mixtures according to the invention as a fuel for diesel engines.

The following Examples are intended to illustrate the invention without limiting it in any way.

EXAMPLES

Starting materials

1. Rapeseed oil fatty acid methyl ester (new plants)

| Composition: | | |
|---|---|---|
| Myristic acid methyl ester | 0.5% by weight | |
| Palmitic acid methyl ester | 4% by weight | |
| Stearic acid methyl ester | 1% by weight | |
| Oleic acid methyl ester | 60% by weight | |
| Linoleic acid methyl ester | 20% by weight | |
| Linolenic acid methyl ester | 9% by weight | |
| Arachic acid methyl ester | 0.5% by weight | |
| Gadoleic acid methyl ester | 2% by weight | |
| Behenic acid methyl ester | 1% by weight | |

| | | |
|---|---|---|
| Erucic acid methyl ester | 2% by weight | |

Iodine value: 108

2. Head-fractionated fatty acid methyl ester based on coconut oil

| Composition: | Caproic acid methyl ester | 1% by weight |
|---|---|---|
| | Caprylic acid methyl ester | 53% by weight |
| | Capric acid methyl ester | 46% by weight |

3. Copolymer ester according to the invention (C)

| Components: | Methacrylate based on methanol | 50% by weight |
|---|---|---|
| | Methacrylate based on $C_{4/14}$ alcohol mixture | 49% by weight |
| | Acrylate based on $C_{1/14}$ alcohol mixture | 1% by weight |

4. Pour point depressant for comparison purposes (D) Carbacryl ® F 45, a product of BASF 5. Pour point depressant for comparison purposes (E) Lubrizol ® 6660, a product of Lubrizol Examples 1 to 3, Comparison Examples C1 to C5

General procedure for determining the cold filter plugging point (CFFP)

The low-temperature stability of diesel fuels is evaluated on the basis of the so-called cold filter plugging point (CFFP) which is the temperature at which diesel fuel sucked through a filter blocks the filter. To determine the CFFP, a sample of the fuel is cooled under prescribed conditions and is drawn through a standardized wire gauze filter into a pipette at intervals at 1 ° C. under a reduced pressure of 20 mbar. The test is continued until the quantity of solid crystals separated out is sufficient to interrupt throughflow or to slow it down to such an extent that the time required to fill the pipette exceeds 60 s or the fuel no longer flows back completely into the sample vessel [European Standard 116]. The results of the tests are set out in Table 1.

TABLE 1

Cold filter plugging points (CFPP)

| Example | Composition | | CFPP °C. |
|---|---|---|---|
| 1 | 79% by weight | rapeseed oil fatty acid methyl ester | −20 |
| | 20% by weight | head-fractionated fatty acid methyl ester | |
| | 1% by weight | Edenor ® 2661 | |
| 2 | 78% by weight | rapeseed oil fatty acid methyl ester | −21 |
| | 20% by weight | head-fractionated fatty acid methyl ester | |
| | 1.5% by weight | Edenor ® 2661 | |
| 3 | 84% by weight | rapeseed oil fatty acid methyl ester | −19 |
| | 15% by weight | head-fractionated fatty acid methyl ester | |
| | 1% by weight | C | |
| C1 | 100% by weight | rapeseed oil fatty acid methyl ester | −5 |
| C2 | 99% by weight | rapeseed oil fatty acid methyl ester | −16 |
| | 1% by weight | C | |
| C3 | 99% by weight | rapeseed oil fatty acid methyl ester | −9 |
| | 1% by weight | D | |
| C4 | 79% by weight | rapeseed oil fatty acid | −13 |

TABLE 1-continued

Cold filter plugging points (CFPP)

| Example | Composition | CFPP °C. |
|---|---|---|
| C5 | 20% by weight methyl ester head-fractionated fatty acid methyl ester<br>1% by weight D<br>99% by weight rapeseed oil fatty acid methyl ester<br>1% by weight E | −12 |

The invention claimed is:

1. A liquid fuel composition consisting essentially of:
   (a) from 58 to 95 % by weight of an ester or a mixture of esters selected from the group consisting of esters of fatty acids with from 12 to 22 carbon atoms and aliphatic alcohols with from 1 to 4 carbon atoms, said esters having an iodine value in the range from 50 to 150;
   (b) from 4 to 40 % by weight of an ester or a mixture of esters selected from the group consisting of esters of fatty acids containing from 6 to 14 carbon atoms and aliphatic alcohols containing from 1 to 4 carbon atoms; and
   (c) from 0.1 to 2 % by weight of an ester or mixture of esters selected from the group consisting of esters of polymers and copolymers of acrylic and methacrylic acids and alcohols containing from 1 to 22 carbon atoms, said liquid fuel composition is sufficiently fluid and pumpable at a temperature of −19° C.

2. A composition according to claim 1, wherein at least 50 % by weight of component (a) consists of a mixture of methyl esters of fatty acids containing from 16 to 22 carbon atoms and from 1 to 3 double bonds.

3. A composition according to claim 2, wherein component (b) consists of methyl esters of saturated fatty acids containing from 8 to 10 carbon atoms.

4. A composition according to claim 1, wherein component (b) consists of methyl esters of saturated fatty acids containing from 8 to 10 carbon atoms.

5. A composition according to claim 4, wherein component (c) contains both (i) methyl esters of poly{methacrylic acid} and (ii) esters of alcohols containing from 4 to 14 carbon atoms with poly{methacrylic acid} in a ratio by weight of subcomponent (i) to subcomponent (ii) within the range from 1:3 to 3:1.

6. A composition according to claim 3, wherein component (c) contains both (i) methyl esters of poly{methacrylic acid} and (ii) esters of alcohols containing from 4 to 14 carbon atoms with poly{methacrylic acid} in a ratio by weight of subcomponent (i) to subcomponent (ii) within the range from 1:3 to 3:1.

7. A composition according to claim 2, wherein component (c) contains both (i) methyl esters of poly{methacrylic acid} and (ii) esters of alcohols containing from 4 to 14 carbon atoms with poly{methacrylic acid} in a ratio by weight of subcomponent (i) to subcomponent (ii) within the range from 1:3 to 3:1.

8. A composition according to claim 1, wherein component (c) contains both (i) methyl esters of poly{methacrylic acid} and (ii) esters of alcohols containing from 4 to 14 carbon atoms with poly{methacrylic acid} in a ratio by weight of subcomponent (i) to subcomponent (ii) within the range from 1:3 to 3:1.

9. A process for operating a diesel engine, wherein the improvement comprises burning a fuel composition according to claim 8 in the engine.

10. A process for operating a diesel engine, wherein the improvement comprises burning a fuel composition according to claim 7 in the engine.

11. A process for operating a diesel engine, wherein the improvement comprise burning a fuel composition according to claim 6 in the engine.

12. A process for operating a diesel engine, wherein the improvement comprises burning a fuel composition according to claim 5 as in the engine.

13. A process for operating a diesel engine, wherein the improvement comprises burning a fuel composition according to claim 4 in the engine.

14. A process for operating a diesel engine, wherein the improvement comprises burning a fuel composition according to claim 3 in the engine.

15. A process for operating a diesel engine, wherein the improvement comprises burning a fuel composition according to claim 2 in the engine.

16. A process for operating a diesel engine, wherein the improvement comprises burning a fuel composition according to claim 1 in the engine.

* * * * *